United States Patent [19]
Ablabutyan

[11] Patent Number: 5,449,267
[45] Date of Patent: Sep. 12, 1995

[54] LIFTGATE PLATFORM WITH LATCHABLE RETENTION RAMP

[75] Inventor: Karapet Ablabutyan, Los Angeles, Calif.

[73] Assignee: Maxon Industries, Inc., Huntington Park, Calif.

[21] Appl. No.: 242,868

[22] Filed: May 16, 1994

[51] Int. Cl.$^6$ ............................................. B60P 1/44
[52] U.S. Cl. .................................. 414/540; 414/545; 187/242
[58] Field of Search ............... 414/540, 545, 546, 557, 414/921; 410/93, 94; 187/216, 240, 242, 243

[56] References Cited

U.S. PATENT DOCUMENTS

| | | | |
|---|---|---|---|
| 2,530,341 | 11/1950 | Satsky | 414/545 |
| 2,576,881 | 11/1951 | Kern | 414/557 |
| 3,651,965 | 3/1972 | Simonelli et al. | 414/540 |
| 3,799,373 | 3/1974 | Randall | 414/557 |
| 4,124,130 | 11/1978 | Rohrs et al. | 414/921 X |
| 4,344,508 | 8/1982 | Peck | 414/546 X |
| 4,556,128 | 12/1985 | Thorley et al. | 414/540 X |
| 4,907,936 | 3/1990 | Bourdage | 414/540 X |
| 4,958,979 | 9/1990 | Svensson | 414/921 X |
| 5,040,936 | 8/1991 | Rhea | 414/540 |
| 5,284,414 | 2/1994 | Kempf | 414/921 X |

Primary Examiner—William E. Terrell
Assistant Examiner—James W. Keenan
Attorney, Agent, or Firm—Frederick E. Mueller

[57] ABSTRACT

A lift platform has a retention ramp whose forward edge is pivotally connected to a rear edge of the platform by a hinge that permits inversion of the retention ramp to a stowed position overlying the platform. A latch member is mounted on a lateral edge of the retention ramp in operative alignment with a detent block secured to the rear edge of the platform, the detent block having a center on the axis of the hinge. The latch member is pivotally mounted and torsionally biased to press the nose portion into engagement with the periphery of the detent block, the latter having detent notches angularly spaced apart relative to its center for defining intermediate and stowed positions of the retention ramp. During movement of the retention ramp between extended and intermediate positions the nose of the latch engages a convex portion of the detent block periphery of a radius to depress the latch against the biasing force of the torsion spring. The detent notches have surface orientations for unidirectionally latching the retention ramp against movement out of the stowed and intermediate positions towards the extended position.

20 Claims, 3 Drawing Sheets

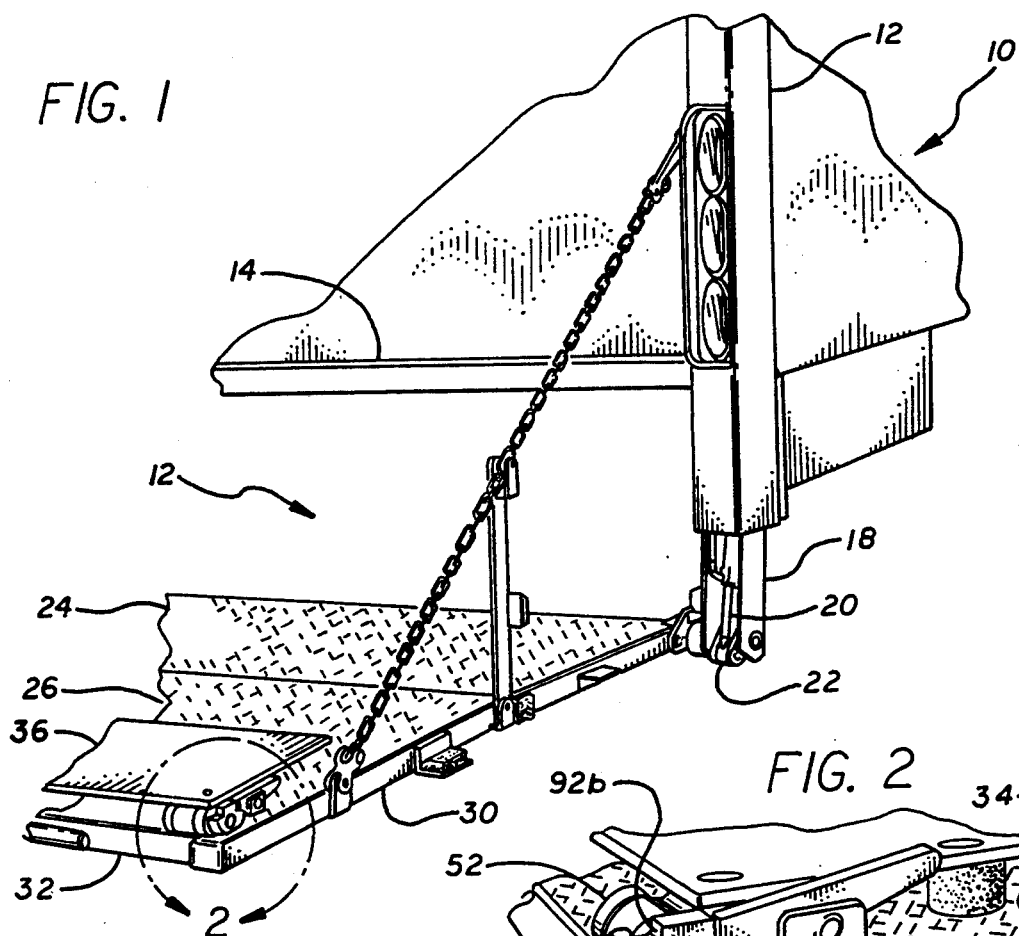
FIG. 1
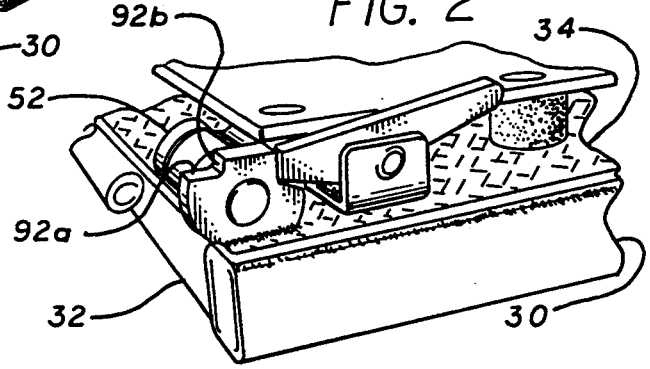
FIG. 2
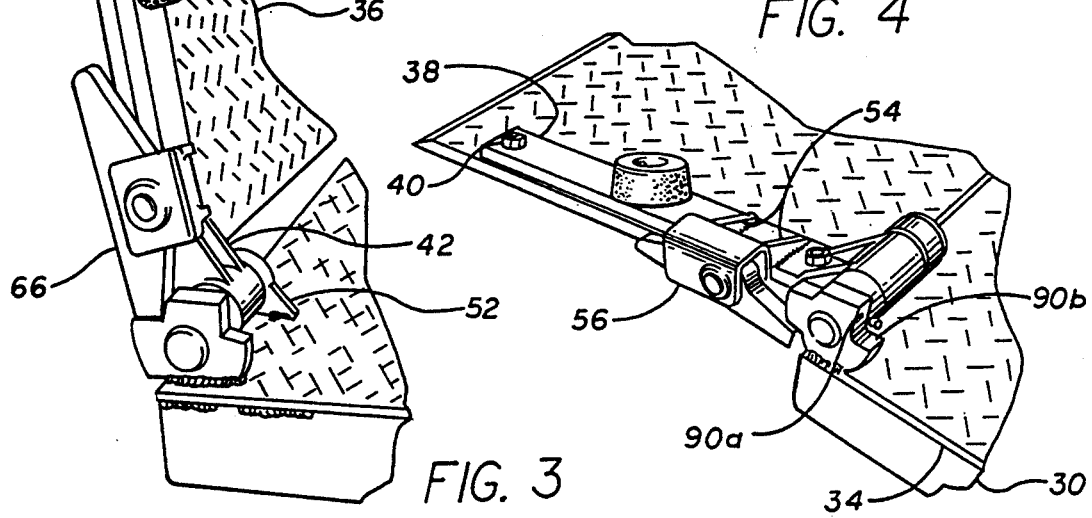
FIG. 3
FIG. 4

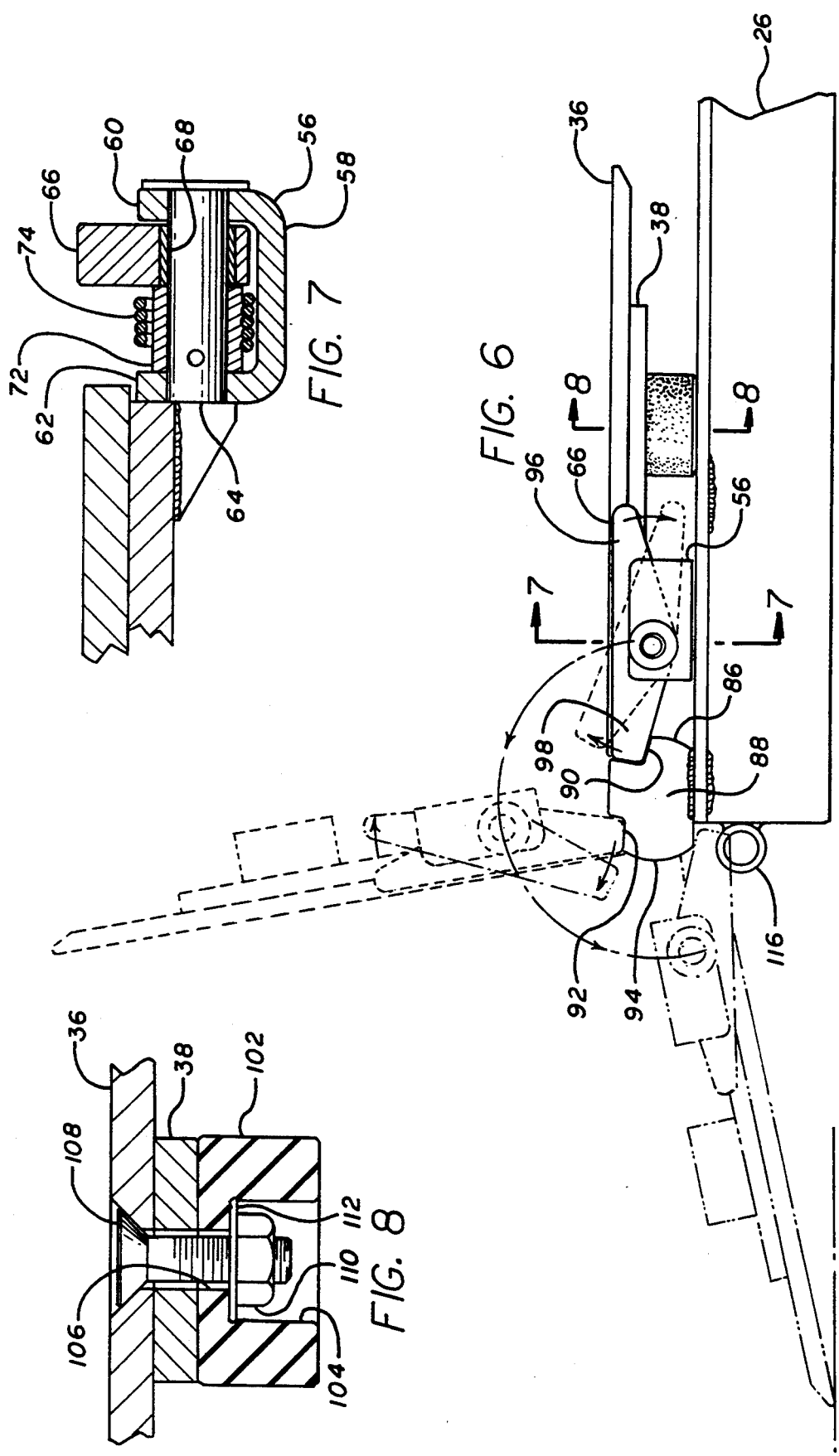

LIFTGATE PLATFORM WITH LATCHABLE RETENTION RAMP

BACKGROUND OF THE INVENTION

The present invention relates generally to lifts and, more particularly, to an improved latching mechanism for the retention ramp of the load platform of a liftgate or other load elevator.

A truck liftgate comprises a load platform mounted at the rear end or tailgate of the body of the truck in a manner to be movable between transit and load bearing positions. In many types of liftgates, where the rear edge of the platform is not made with an integral ramp to define the transition surface between ground level and the load bearing upper surface of the load platform, the relatively blunt rear end of the platform is fitted with a pivotally mounted plate that can be swung between a ramping position as an extension of the platform wherein its rear edge or lip engages the ground and a stowed position overlying the upper surface of the load platform. This plate is sometimes fitted with a mechanism whereby the plate can be held in an erect or upstanding position relative to the horizontally extended load platform and so provide a barrier to keep wheeled carts or other freight from displacement beyond its rear edge. Hence, the plate is commonly called a retention ramp, reflecting its dual function.

In the prior art, the set of hardware to hold the plate in the erect retention position typically comprises a pair of short lengths of chain, sometimes axially springloaded, mounted on the surface of the opposite sides of the load platform and a pair of brackets welded to opposite sides of the ramp in alignment with the chain positions. When certain links of the pair of chains, e.g., the second link from the free end, are fitted into slots of the pair of brackets, the retention ramp is then held in the desired position. Another set of hardware is used to hold the retention ramp in a folded position overlying the upper surface of the load platform. Thus, one side of the retention ramp may have a spring-loaded bayonet latch, whose point is engageable with an aperture in a bracket carried on the surface of the load platform. The bayonet latch has a handle closely overlying the platform surface when the retention ramp is in the stowed position thus affording only a slight clearance for the hand or knuckles of the driver in pulling the bayonet latch out of locked position against the force of the spring.

As all of these components of the two hardware sets are surface mounted on the retention ramp and platform they present obstacles to the loading and unloading of freight as well as presenting a danger of tripping for an unwary driver. The devices are also cumbersome in use as they require the driver to ensure that the proper links of the chain lengths be securely anchored in the corresponding bracket slots and that the bayonet latches be properly manipulated to successfully lock the retention ramp in the stowed position to avoid an unlocked retention ramp that will bang against the platform when the truck is in transit from place to place. These devices involve an undue multiplicity of separately attached sets of hardware which is therefore relatively expensive and, as the hardware sets are carried in exposed positions prone to being damaged, they entail excessive maintenance expense.

The present invention obviates the foregoing and other disadvantages of prior art mechanisms.

SUMMARY OF THE INVENTION

A liftgate includes a platform assembly comprising a rigid framework, typically made of tubular members, covered on one side with a sheet metal skin whose exposed surface provides the load bearing surface. The platform is typically rectangular in overall plan configuration and along its transversely disposed rear edge is fitted with a rectangular plate that is relatively narrow, as compared to the fore and aft depth of the platform, and may have up to substantially the same width laterally of the truck body as that of the platform. The rectangular plate is fitted along its opposite sides with a pair of rigidly secured strap members to support a coaxial pair of tubular bearings projecting beyond and parallel to an edge of the plate to be pivotally secured to a coaxial pair of pins rigidly supported along the rear edge of the platform assembly. In a ramping position, a beveled rear edge of the plate contacts a ground surface as an extension of the platform while inclining upwardly to a forward edge disposed in close proximity to the rear edge of the load supporting surface of the platform. The pivot axis of the plate is elevated above the load bearing surface of the platform assembly such that the plate can be turned to a substantially vertically erect position to serve as a barrier or, alternatively, to a stored position overlying the rear edge portion of the platform.

The latching mechanism for the plate is a latch set that comprises a detent block, preferably mounted on the curbside of the platform assembly adjacent its rear edge, and a pivotally mounted latch member carried on that strap secured to the curbside of the plate. The detent block is formed with a pair of notches angularly spaced apart with respect to the hinge axis of the plate to define the barrier positions and storage positions of the plate. The detent notches are alternately engageable by a forward or inner end of the latch carried by the plate. The other end of the latch, on the opposite side of the latch pivot axis, serves as a handle for manipulating the latch to disengage its inner end from an engaged notch. A convex rearwardly facing surface of the detent block is formed with a radius engageable by and counterbiasing the inner end of the latching member during transition of the plate between its ramping and barrier positions.

The latch is housed in a U-shaped shell rigidly carried by the curbside strap of the plate and, also, houses a torsion spring normally biasing the inner end of the latch towards a position to engage the detent notches or convex surface of the detent block. When the plate is in the storage position overlying the platform assembly the inner end of the latch unidirectionally locks the plate against displacement out of a position in substantial parallelism to the load bearing surface of the platform assembly. In order to protect the latch member and its housing against impact with the load bearing surface of the platform the opposite sides of the plate are each fitted with a resilient bumper or cushion of an axial length sufficient to normally maintain the U-shaped latch bracket out of contact with the platform.

BRIEF DESCRIPTION OF THE DRAWINGS

FIG. 1 is a partial perspective view of a liftgate equipped truck body having a load platform and retention ramp plate incorporating my invention.

FIG. 2 is a perspective view of the area 2 of FIG. 1, on a larger scale, showing the retention ramp in a storage or retracted position.

FIG. 3 is a fragmentary perspective view of the relative position of the components in a barrier-defining position.

FIG. 4 is a partial perspective view of the components of FIGS. 2 and 3 in a ramp-defining position of the plate.

FIG. 6 is a partial side elevational view of the components in the position of FIG. 2 and showing, in dotted outline, the two alternate static positions of the plate.

FIG. 7 is a partial sectional view taken on the line 7—7 of FIG. 6.

FIG. 8 is a partial sectional view, on a larger scale, taken on the line 8—8 of FIG. 6 showing interior details of the bumper pad construction.

DESCRIPTION OF THE PRESENTLY PREFERRED EMBODIMENT

Figure 5:
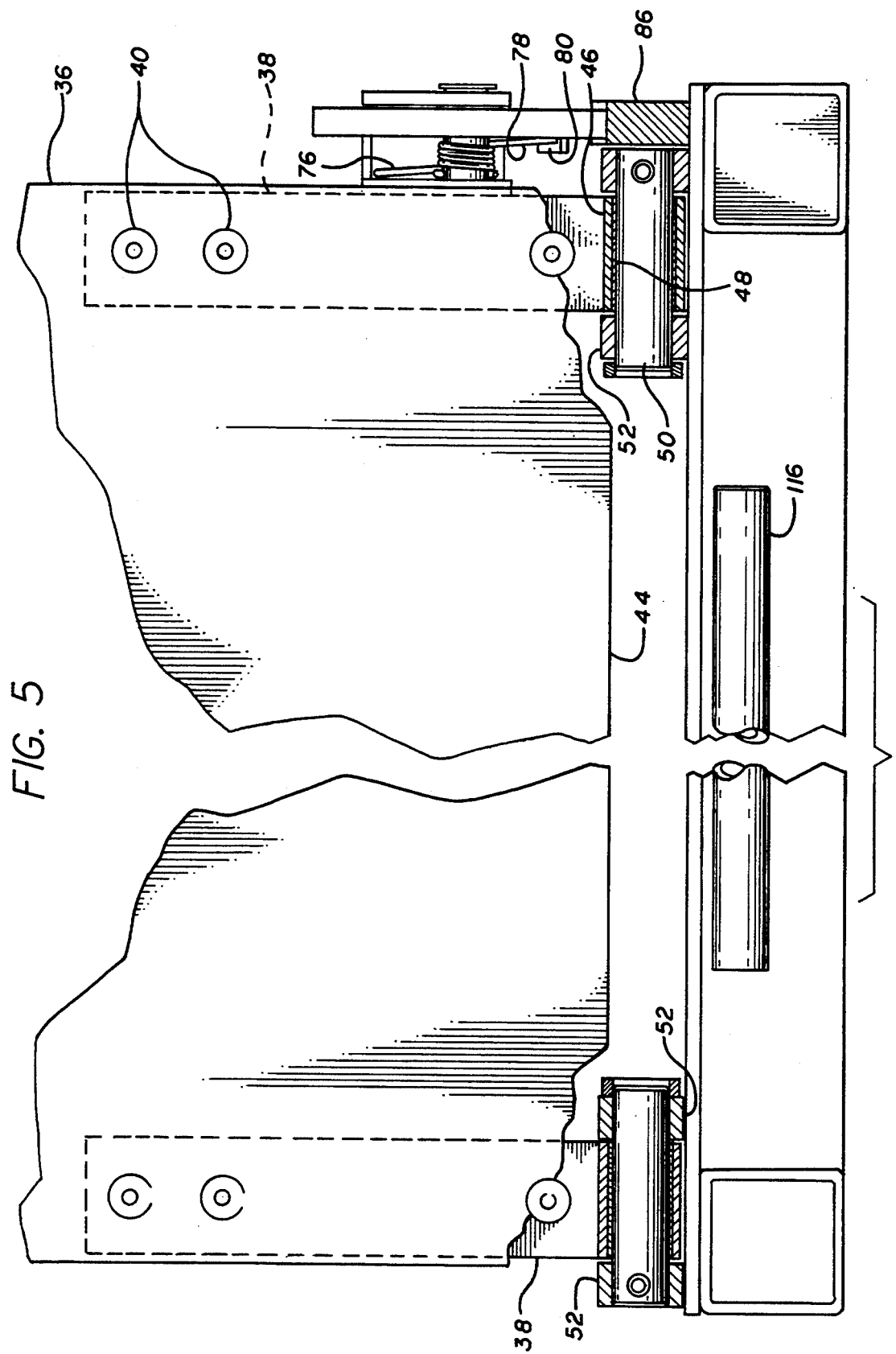
FIG. 5 is a rear elevational view, partly in section, of the components when in the FIG. 3 position.

Before explaining the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

FIG. 1 is illustrative of the usual environment of the invention comprising a truck body 10 whose rear end opening is fitted with a liftgate, designated generally by the numeral 12. The liftgate is shown in an open or operative condition of its platform ready for use in loading and unloading freight between ground level and a bed 14 of the truck body but it will be understood that the liftgate is of the usual type whose platform is foldable into a raised transit position. The liftgate 12 is purely illustrative since the present invention can be employed with any lift, hoist or elevator in which it is desired to have a latchable retention ramp for the load platform.

In the illustrated case, the liftgate comprises a pair of opposite side columns 16, the curbside one of which is shown, containing a downwardly extendable and retractable runner assembly 18 operatively associated with a power means (not shown). The runner assembly contains an auxiliary cylinder 20 drivingly coupled to a crank mechanism 22 by means of which the illustrated platform can be actuated between the horizontally extended operative position shown and a vertically collapsed or folded position. It will also be understood that the power means of the liftgate 12 effects raising and lowering of the platform, whether folded or open, between ground level and the level of the bed 14 of the truck 10.

The invention is particularly useful with load platforms of large area, such as the illustrated case, wherein the platform comprises a forward platform assembly 24 and a relatively foldable rear platform assembly 26. Such liftgates, e.g., of the general type depicted in U.S. Pat. No. 4,007,844, are frequently used in the loading and unloading of truck bodies at locations not having a loading dock where the cargo, e.g., a wheeled cart, is required to be moved between the truck bed and the raised platform or between the ground and the lowered platform. In the former instance, it is important to have a barrier to prevent the cart from rolling off the rear edge of the platform while, in the latter case, a ramp is of critical importance for ease of transition of a cart between the platform and ground level.

Each platform section comprises a rigid framework covered on one side by a surface skin. Thus, in the outer platform section 26 (whose construction is typical) each of the opposite sides of its framework comprises a tubular member 30, the pair of side members being rigidly interconnected by a plurality of parallel, spaced apart, transversely extending tubular members such as the member 32 defining the rear edge of the frame. One side of this frame is then covered by a substantially congruent sheet of metal 34 which may have a diamond plate finish to provide better traction.

The rear edge of the outer platform section 26 is provided with a pivotally mounted retention ramp 36 which can be moved into the positions of FIGS. 2, 3 and 4. More particularly, each side of the retention ramp 36 on one surface thereof has a strap 38 secured thereto by appropriate fasteners 40. Each of the forward ends of the straps 38, either integrally formed therewith or welded thereto and to the retention ramp 38, comprises a spaced apart parallel pair of webs 42 projecting beyond a forward edge 44 of the retention ramp to fixedly support a sleeve 46 that contains a bushing 48. Each of the bushings is journalled on a hinge pin or shaft 50, the coaxial pair of shafts being mounted at opposite ends in a pair of brackets 52 rigidly mounted in upstanding relationship to the skin 34 along the rear edge of the platform section 26.

The curbside strap 38 is rigidly fitted, as by welding, with a parallel spaced apart pair of triangular transverse gussetts 54 having a U-shaped latch housing 56 welded to edges of the gussetts in a position to project laterally beyond the curbside edge of the retention ramp 36. Thus, referring to FIG. 7, the housing 56 comprises a web portion 58 and a parallel pair of opposite side walls 60, 62. The housing sidewalls are formed with a coaxial pair of holes to receive a shaft 64 on which a latch member 66 is pivotally mounted at about its midpoint by means of a bushing 68. The shaft 64 also coaxially supports a sleeve 72 around which a torsion spring 74 is coiled. As is shown in FIG. 5, the torsion spring has fixed opposite terminal end portions 76 and 78, one of which engages a lug 80 secured to the inside face of latch member 66 to normally bias it anti-clockwise as viewed in FIGS. 2–4.

Secured, as by welding, to skin 34 on the curbside rear edge portion of the platform section 26 is a detent member designated generally by the numeral 86. The body of the detent member is centered at 88 with respect to the axis of the corresponding shaft 50. The detent member is positioned within the vertical plane through which the latch member 66 rotates when the retention ramp is turned about the pair of shafts 50 and center 88. The detent member is formed with a pair of detent notches 90 and 92 that are angularly spaced apart with respect to the center 88. As viewed in FIG. 6, the detent notch 90 opens upwardly and forwardly while the detent notch 92 opens upwardly and rearwardly. The rear side of the detent block 86 is formed with a convex surface 94 defined by an arc centered at 88 of a radius sufficiently large to slightly depress the nose of latch 66 against the force of spring 74.

The rear or outer end with respect to center 88 portion of the latch member 66 comprises a handle 96 while the other or inner end of the latching member defines a pawl 98 whose nose surface has an angular contour complementary to that of the detent notches 90 and 92. More particularly, the detent notch 90 is defined by an angularly related pair of planar surfaces 90a and 90b, the former of which has a slope relative to the center 88 of the detent block (as viewed in FIG. 6) such that the pawl 98 can be rotated out of the detent notch 90 by applying a clockwise force to the handle 96 but which slope prevents counterclockwise rotation of the retention ramp 36 when a counterclockwise force is applied to the retention ramp. In similar fashion the detent notch 92 is defined by angularly related essentially planar surfaces 92a and 92b such that when the retention ramp 36 is in the vertically upstanding dotted outline position of FIG. 6, a clockwise force on the handle 96 effects rotation of the pawl 98 out of the detent notch 92 but the slope of the face or surface 92a relative to the center 88 prevents counterclockwise movement of the retention ramp 36 when a counterclockwise force is applied to the retention ramp. When the retention ramp is released from the upstanding intermediate position of FIG. 6, the biased pawl nose 98 slides around and is depressed by the convex surface 94 of the detent block until the rear or outer end of the ramp comes into contact with ground level, when the depressed pawl nose engages the underside of the detent block that protrudes rearwardly beyond the rear frame member 32 of the platform section 26.

The straps 38, at a location more radially remote from the axis of the shaft 50 than the housing 56, each mounts a bumper pad 102 of an elastomeric material for cushioning the retention ramp when it is dropped into the solid outline position of FIG. 6. More specifically, the bumper pad 102 is cup-shaped having a central pocket 104 whose floor is formed with a central aperture 106 that is coaxially aligned with holes through the strap 38 and retention ramp 36, the latter being formed with a countersink bore to receive a head of a bolt 108. The shank of the bolt passes through the aligned openings to threadedly receive a nut 110 over a washer 112 within the pocket 104 that fastens the pad 102 in place. As shown in FIG. 6, the axial length of the circular wall of the pad 102 is such that when the retention ramp 36 is in a static position overlying the platform section 26, the web portion 58 of the housing 56 is maintained out of contact with the platform section. Preferably, the bumper pad 102 is made of a sufficiently dense elastomeric material to inhibit compression thereof to an extent that damage to the latching mechanism would result, when the retention ramp 36 is dropped into the FIG. 6 solid line position.

The operation of the device is as follows. Let it be assumed that the liftgate 12 has been opened and its platform lowered to the rearwardly horizontally extending position depicted in FIG. 1. The retention ramp 36 remains locked in the retracted or stowed position shown in solid outline in FIG. 6. Since the pawl nose 98 of the latch 66 is biased into the detent notch 90 of the detent block 86, if the driver now wishes to move a load from the ground surface onto the load bearing surface of the platform assemblies 24 and 26, he applies a clockwise (as viewed in FIG. 6) force to the handle 96 of the latch 66 to momentarily release the pawl nose 98 from the detent notch 90 to raise the pawl nose out of interfering alignment with the surface 90a of the detent notch. Thereupon, the retention ramp 36 is rotated towards the ramping position with one hand, while the other hand releases the handle of the latch member 66 after the pawl nose of the latch passes beyond the other detent 92 of the detent member 86. During continued rotation of the retention ramp 36, the pawl nose rides on the arcuate rear surface 94 of the detent block until the lip of the retention ramp engages a ground surface as an extension of the platform.

The retention ramp being supported along one edge by the ground, loads can now be moved thereacross and onto the load bearing surface of the platform assemblies 24 and 26. In this connection, note that a horizontally disposed cylindrical member 116 is secured, as by welding, to a central portion of the rear face of the transverse member 32 of the platform assembly 26 to engage and support the underside of the intermediate forward end of the retention ramp 36. Once the load has been placed in the geometric center of the lifting area of the platform assemblies 24 and 26, the ramp is manually rotated out of the ramping position of FIG. 4 into the retention position of FIG. 3 merely by lifting the distal end of the ramp without touching latch 66. During this rotation, the pawl nose 98 of the latch member 66 is biased against and slides over the arcuate surface 94 of the detent member until the pawl nose comes into registration with the detent notch 92, when the pawl nose clicks into engagement with the detent notch 92 under the force of its torsion spring 74. Preferably, the angular position of the detent notch 92 relative to the center 88 of the detent block locks the retention ramp at an included angle relative to the platform of slightly more than 90 degrees. Thereafter, retention ramp 36 firmly opposes any force tending to rotate it back towards the ramping position. The power means of the liftgate can now be energized to effect lifting of the load from ground level to the level of the bed 14 of the truck body 10.

The retention ramp 36 can be rotated from either the ramping position of FIG. 4 or the retention position of FIG. 3 into the retracted position of FIG. 2 merely by appropriate rotation of the ramp without any necessity for the driver to manipulate the latch member 66. If the driver should drop, rather than place, the retention ramp into the fully folded position of FIG. 2, the pair of bumper cushions 102 at opposite sides of the retention ramp 36 resiliently absorb the shock, thus protecting the latch member 66 and its housing 56.

I claim:

1. A lift platform comprising:
   a load platform and a retention ramp having adjacent edges;
   a hinge means for pivotally connecting said platform and said retention ramp together adjacent said edges along a pivot axis that is offset from a load bearing surface of said platform whereby said retention ramp can be rotated around said axis between stowed and ramping positions of said retention ramp relative to said platform,
   said retention ramp overlying said platform in said stowed position and comprising an extension of said platform in said ramping position; and
   a latch means interconnected between said platform and said retention ramp for selectively and releasably retaining said retention ramp in said stowed position and, alternatively, in an intermediate position in which said retention ramp is retained in an upstanding position relative to said platform, said latch means comprising selectively latchable parts for defining said stowed and intermediate positions in which said retention ramp is unidirectionally latched against rotation out of said stowed position towards said intermediate position and, alternatively, unidirectionally latched against movement out of said intermediate position towards said ramping position.

2. A lift platform as in claim 1 in which:

said latch means comprises a latch member mounted on said retention ramp and a detent block mounted on said platform, said latch member and said detent block being positioned at said adjacent edges of said retention ramp and said platform for rotation of said latch member relative to said detent block around said pivot axis of said hinge means.

3. A lift platform as in claim 2 in which:

said latch member and said detent block are mounted within a common plane including a lateral side of said platform;

said latch member being pivotally mounted and having a means for biasing a nose portion of said latch means into contact with said detent block.

4. A lift platform as in claim 3 in which:

said selectively latchable parts comprise said nose portion of said latch member and angularly spaced apart portions of said detent block that are sequentially engageable by said nose portion upon rotation of said retention ramp around said pivot axis of said hinge means.

5. A lift platform as in claim 4 in which:

said angularly spaced apart portions of said detent block each comprises a notch, a first one of said notches being located to define said stowed position of said retention ramp in substantial parallelism of said retention ramp and said platform.

6. A lift platform as in claim 5 in which:

said latch member is mounted within a housing and has an opposite end from said nose portion comprising a handle for said pivotally mounted latch member;

said retention ramp being fitted at each of its opposite sides with a resilient bumper pad of sufficient thickness to maintain said latch housing out of contact with said platform when said retention ramp is in said stowed position.

7. In a lift platform having, in combination, a platform and a retention ramp that are pivotally interconnected by a hinge means along adjacent edges of the platform and the retention ramp, the improvement comprising;

a latch means interconnected between said platform and said retention ramp for selectively and releasably retaining said retention ramp in a stowed position overlying the platform and, alternatively, in an intermediate position in which said retention ramp is retained in an upstanding position relative to said platform, said latch means comprising selectively latchable parts for defining said stowed and intermediate positions in which said retention ramp is unidirectionally latched against rotation out of said stowed position towards the intermediate position and, alternatively, unidirectionally latched against movement out of said intermediate position towards a ramping position comprising a rearward extension of the platform.

8. The improvement of claim 7 in which:

said latch means comprises a latch member mounted on said retention ramp and a detent block mounted on said platform, said latch member and said detent block being positioned at said adjacent edges of said retention ramp and said platform for rotation of said latch member relative to said detent block around said pivot axis of said hinge means.

9. The improvement of claim 8 in which:

said latch member and said detent block are mounted within a common plane including a lateral side of said platform;

said latch member being pivotally mounted and having a means for biasing a nose portion of said latch means into contact with said detent block.

10. The improvement of claim 9 in which:

said selectively latchable parts comprise said nose portion of said latch member and a pair of angularly spaced apart portions of said detent block that are sequentially engageable by said nose portion upon rotation of said retention ramp around said pivot axis of said hinge means.

11. The improvement of claim 10 in which:

said pair of angularly spaced apart portions of said detent block each comprises a notch, a first one of said notches being located to define said stowed position of said retention ramp in substantial parallelism of said retention ramp and said platform, the second of said notches being configured to release said nose portion in response to turning of said retention ramp from said intermediate position towards said stowed position.

12. The improvement of claim 11 in which:

said latch member is mounted within a housing and has an opposite end from a said nose portion comprising a handle for said pivotally mounted latch member;

said retention ramp being fitted at each of its opposite sides with a resilient bumper pad of sufficient thickness to maintain said latch housing out of contact with said platform when said retention ramp is in said stowed position, said first notch being configured to release said nose portion of said latch member in response to rotation of said handle in a direction to displace said nose portion from said first notch.

13. A latch set for a truck liftgate of the type comprising a load platform having a retention ramp whose forward edge is pivotally connected to a rear edge of the load platform by a hinge means that permits inversion of the retention ramp to a stowed position overlying the platform, said latch set comprising:

a latch member;

a support means for mounting said latch member on and adjacent to the forward edge of the retention ramp;

a block for mounting on the load bearing surface of the platform adjacent to the rear edge of the platform in operative alignment with said latch member;

said latch member and said block having latchable parts for selectively and releasably retaining the retention ramp in the stowed position and, alternatively, in an intermediate position in which the retention ramp is retained in an upstanding position relative to the platform, said latchable parts having complementary configurations for unidirectionally latching the retention ramp against rotation out of the stowed position towards the intermediate position and, alternatively, unidirectionally latching the retention ramp against movement out of the intermediate position towards a ramping position of the platform.

14. A latch set as in claim 13 in which:

said support means comprises a strap for affixation to a lateral side edge of the retention ramp; and said block comprises a means for affixation of said block to the platform;

said latch member being mounted on said support means for movement of said latch member relative to said support means.

15. A latch set as in claim 14 in which:

said block has a center around which said latching member, when mounted on the retention ramp, can be angularly displaced when said center of said block is positioned on the platform coaxially with the hinge means of the platform and retention ramp by said means for affixation of said block to the platform; and said latchable parts comprise a nose portion of said latching member and a pair of angularly spaced apart portions of said block that are sequentially engageable by said nose portion upon rotation of the retention ramp around said center of said block.

16. A latch set as in claim 15 in which:

said pair of angularly spaced apart portions of said block each comprises a detent notch;

said pair of notches being angularly spaced apart and positioned to define the stowed and intermediate positions of the retention ramp;

said latching member being pivotally mounted on said support means for selective engagement of said detent notches by said nose portion when in registration with one or the other of said notches;

said latch member having an opposite end from said nose portion comprising a handle for said pivotally mounted latch member by means of which said nose portion can be displaced from said notches.

17. A latch set as in claim 16 in which:

said support means for said latch member comprises a housing projecting laterally from said strap for positioning said latch member laterally beyond a side of the retention ramp when said strap is affixed to the retention ramp;

said strap being fitted with a bumper pad at a position distally adjacent to said housing, said bumper pad being of sufficient thickness to maintain said latch housing out of contact with the platform when the retention ramp is in the stowed position.

18. A latch set as in claim 16 in which:

said notches are angularly spaced apart relative to said center of said block, each of said notches having a first surface orientation relative to said center of said block to stop rotation of the retention ramp in a direction away from the stowed position whenever said notch is engaged by said nose of said latch member, said first surface orientation also permitting displacement of said nose portion therefrom by actuation of said handle.

19. A latch set as in claim 18 in which:

said nose portion of said latch member is biased for normally engaging said notches, each of said notches having a second surface orientation delimiting biased movement of said nose portion whereby said nose portion is arrested in a static position of engagement by said first surface orientation of the corresponding one of said notches.

20. A latch set as in claim 19 in which:

said block is formed with a convex surface relative to said center that is engageable by said nose portion of said latch member when the retention ramp is rotated between ramping and intermediate positions, said convex surface defining a locus for counter-biasing said nose portion of said latching member during traverse over said convex surface.

* * * * *